UNITED STATES PATENT OFFICE.

WILLIAM H. MASON, OF BOSTON, MASSACHUSETTS.

IMPROVEMENT IN LUBRICATING-OILS.

Specification forming part of Letters Patent No. 8,971, dated May 25, 1852.

*To all whom it may concern:*

Be it known that I, WILLIAM HOWE MASON, of Boston, in the county of Suffolk and State of Massachusetts, have invented and discovered a new and useful composition of matter to be mixed with common oils, and when so mixed forming a valuable compound for lubricating machinery and for burning; and I hereby declare that the following is a true and accurate statement of my invention.

The great expense of good oil to be used as a lubricating material for axles in machinery, and for other purposes, and the vastly increased uses from the multiplication of railroads and manufacturing establishments render it a desideratum of great moment to produce a good substitute for the best, or at least for a superior quality of oil suitable especially for a lubricator. To attain this end I have spent much time and expense in trying various mixtures of oils with each other and of other materials with oils.

It is well known that the article called "whale-oil," and other cheap materials of this class, contains so much mucilage that adheres to and so hardens and gums the machinery as to prevent its use for such purposes, and the expense of sperm-oil is so great as to forbid its use. I have ascertained, by a series of experiments, that if I dilute a certain quantity of whale or other cheap oil with a certain quantity of camphene or pure spirits of turpentine, and a still smaller quantity of benzole, (the latter having the additional property of neutralizing the disagreeable odor of the spirits of turpentine,) the mucilage and gumming tendency of the oil is entirely removed, and so far as this quality is concerned the mixture is as good a lubricator as the best sperm-oil; but in obtaining this valuable result I have learned that the mixture lacks body, and is too thin and too readily runs away from the friction-surfaces. After experimenting some time to find some material that should remove this difficulty, I found that a small quantity of glycerine or soap-makers' waste, mingled with a little carbonate of potash, would mix freely with the compound oil and give it the body required. I also learned that gum benzoin and camphor gave additional body to the compound.

To prepare my compound, take nine gallons of camphene or spirits of turpentine, and one gallon of benzole. Then add to the above six ounces carbonate of potash previously mixed with two pounds of glycerine, and then stir in about two pounds of gum-benzoin, also about four pounds of refined camphor, and to one gallon of this compound I add nineteen gallons of whale or other equivalent cheap oil, and stir the mixture for about an hour, and it is fit for use.

Having described the character of my invention, I will state that I am aware that spirits of turpentine and carbonate of potash have been used before my invention in lubricating compounds, and I do not therefore claim them, except as specific agents to accomplish a definite and specific purpose stated in the specification.

What I claim as my invention, and desire to secure by Letters Patent, is—

The combination of a mixture of camphene and benzole, carbonate of potash, and glycerine with whale or other cheap oil having similar properties, in the manner and for the purposes set forth.

In testimony whereof I have hereunto set my hand this 3d day of November, A. D. 1851.

WM. H. MASON.

Witnesses:
DEXTER M. TUCKER,
BENJ. E. TUCKER.